United States Patent
Lange

[15] 3,661,654
[45] May 9, 1972

[54] PROCESS FOR AUTOGENEOUS FLAME CUTTING

[72] Inventor: Gerhardt Lange, Frankfurt am Main, Germany

[73] Assignee: Messer Griesheim GmbH, Frankfurt am Main, Germany

[22] Filed: Sept. 4, 1970

[21] Appl. No.: 69,974

Related U.S. Application Data

[63] Continuation-in-part of Ser. No. 687,344, Dec. 1, 1967, abandoned.

[30] Foreign Application Priority Data

Dec. 7, 1966  Germany .................... P 15 52 944.9

[52] U.S. Cl. .................................................. 148/9

[51] Int. Cl. ............................................ B23k 7/00
[58] Field of Search ................................. 148/9, 9.5

[56] References Cited

UNITED STATES PATENTS 2,491,024  12/1949  Babcock .................................. 148/9

*Primary Examiner*—L. Dewayne Rutledge
*Assistant Examiner*—W. W. Stallard
*Attorney*—Connolly and Hutz

[57] ABSTRACT

The flame cutting of seams to predetermined depths is characterized by reducing the cutting oxygen pressure more than 50 percent, and preferably 75 percent, of conventional cutting oxygen pressures. The cutting oxygen pressure is preferably 0.1 to 0.5 atmospheric excess pressure.

12 Claims, 7 Drawing Figures

Patented May 9, 1972 3,661,654

PROCESS FOR AUTOGENEOUS FLAME CUTTING

CROSS-REFERENCE TO RELATED APPLICATION

This application is a continuation-in-part of copending application Ser. No. 687,344, filed Dec. 1, 1967 and now abandoned.

BACKGROUND OF INVENTION

Flame cutting originally was a pure separating process. Today it has become a finishing process with such precision and economy that it can advantageously compete with other separating processes.

The prerequisite for the production of cutting surfaces with high surface finish and accuracy to size is a cutting nozzle clear of splashes and impurities, the correct setting of the heating flame and of the cutting oxygen pressure, as well as the maintenance of the advance speed of the torch corresponding to these factors. These factors are dependent moreover on the thickness and type of material to be cut, the fuel used, and the temperature of the workpiece. In flame cutting, an exothermic reaction is needed. Furthermore, the ignition temperature of the metal must be lower than its melting temperature, and the combustion product must be easily moved by the cutting oxygen stream.

The heating flame is used for preheating the material to combustion temperature. It generally consists of at least one ring of individual flames concentrically arranged about the cutting oxygen boring. The heat transfer to the work piece takes place by beaming the flame cone and touching the work piece with the flame gases of the side flames.

The correct amount of cutting oxygen occurs by using the oxygen pressure prescribed depending on the size of nozzle and thus the thickness of material. This pressure differs with respect to each make of nozzle, and the setting is made on the basis of the cutting table relative to each torch.

The cutting oxygen is required for the combustion of the material present in the cutting seam to be made and for the kinetic removal of the burned material, namely the liquid slag. For the latter, forces are required which must be transferred by the beam to the slag and which in proportion to the tenacity and advance speed are vertical to the beam direction and the contact surface. Until now — as described in *Schweissen und Schneiden*, 1952, Issue 6, page 204 — it has been assumed that both oxygen amounts are about equal. The experiment to increase the pressure beyond the given measure showed that the cutting speed is at first somewhat increased but quickly drops at constant pressure increase. The cause of this relationship is explained in that the oxygen portion needed for oxidation remains constant for a certain amount of iron which must be converted to slag. The amount of oxygen not participating in the oxidation becomes greater during pressure increase. In the same manner the cooling effect becomes also more intense by the resulting expansion cooling so that the completion of the cutting process is inhibited.

The highest cutting speed, i.e. the advance speed of the torch, is the one at which the cut does not yet discontinue. However, there results because of the deviation of the oxygen stream, a strong scoring track alignment with increasing cutting depth, which can impair the surface finish of the cut, but in straight cutting is of no disadvantage. However, in cutting of corners, the cutting stream can already have by-passed the corner at the upper edge of the work piece, while at the lower edge the corner had not yet been reached by the cutting stream so that here the cutting stream is deflected at right angles to the cutting direction and a greater rounding off of the lower edge takes place.

The deflection of the cutting oxygen stream in a direction opposite the cutting direction takes place in that the appearing oxygen is relatively pure at the beginning and thus has a great oxidation speed, while upon penetration of the oxygen stream into the cutting seam, the degree of purity and thus also the oxidation speed decrease. At a too low a cutting speed the grooves become too large and erosion results. The makers of the nozzles therefore give values for the most advantageous cutting speed in the cutting tables.

The cutting takes place normally starting with a work piece edge, whereby first the edge is preheated to combustion temperature by the heating flame, and then the cutting begins with the opening of the cutting oxygen valve. With respect to the acetylene oxygen flame, the hottest point is directly before the top of the brightly lit flame cone. The distance of the torch from the work piece surface should therefore be so great as to have the cone points of the flames almost seated, so that the heat efficiency is completely utilized.

If the cut should take place in the complete material, e.g. for the cutting of cutouts, first a hole must be pierced. The circular hole and the oblong hole punching method is used for this.

With respect to the round hole punching, the cutting nozzle for preheating is held vertically with respect to the metal to be cut, whereby the flame cone tips are almost seated. If the work piece surface has taken on combustion temperature, the cutting oxygen valve is slowly opened up to the maximum pressure given in the cutting table, whereby the torch is simultaneously lifted up to 40 mm according to the sheet steel thickness in order to protect the nozzle from slag spray, etc. Here the cutting stream bores into the sheet steel and the slag is sprayed away upwards until the cutting stream emerges at the lower edge of the sheet steel.

Because of this and for economic considerations, the oblong hole punching is used most often. Here, during continuous opening of the cutting oxygen valve to the corresponding maximum pressure given in the cutting table, the torch is moved not upwards but forwards in the cutting direction. A punching through up to 300 mm is possible with this method.

SUMMARY OF INVENTION

An object of this invention is to provide a flame cutting process which is also useful for flame cuts which do not go completely through the material, but penetrate into the material only up to a certain depth.

A further object of the invention is to make possible the cutting out of grooves, notches, etc., of certain depth or height, respectively, or length, using cuts defined by their depth.

German Pat. No. 1,112,874 describes the flame cutting of a bell seam side for by first cutting a semi-cylindrical concave mold into the frontal side of the sheet metal in the vicinity of its lower edge and parallel to it with the help of an autogeneous cutting torch and then carrying out a miter cut which cuts away the edge situated above the concave mold. The miter cut in each case cuts away the lower edge if the cutting stream is only tangent to the concave mold and to an extent cuts away even then when it strikes the concave mold. This is required by the fact that the combustion process is not arrested during the touching of the concave mold. In order to improve this process, it has been proposed to blow in air or inert gas during the miter cut into the concave mold as the suppressor for the combustion process.

According to the present invention, for the flame cutting of grooves of certain depth, it is proposed to reduce the oxygen pressure as compared to previously customary pressures by more than 50 percent, preferably by more than 75 percent, corresponding to the desired cutting depth. The oxygen pressure required for each cut, depending on nozzle shape, fuel gas, type of material, thickness of material, cutting speed, and work piece temperature, can be ascertained by anyone skilled in the art in the usual empirical manner using the cutting tables prescribed for cutting through the workpiece. The direction alone to reduce the pressure by more than half gives him a sufficient technical teaching for carrying out the broad concepts of this invention.

The unexpected result of the inventive proposal is that it is at all possible, with such a low cutting oxygen pressure, to carry out a cutting process and in addition to obtain still usable cutting edges. Earlier investigations, such as reported in Technische Mitteilung, 1959, Issue 2 — Cochius, Kohtz and Teske m paragraph 5.2 regarding Thermodynamik des Brennschneidens, have shown that the oxygen pressure may not be changed by more than 1.5 at, whereby the nozzle pressure is within the change range. Pressures which were too low resulted in a too strong a scoring track alignment and adhering slag. The novel proposal surpasses this amount of 1.5 at, as shown by the examples given hereafter.

A possible explanation for the result is that by means of the reduced oxygen pressure and the thus reduced amount of oxygen in the cutting seam, there sets in relatively soon a reducing of the oxidation speed on the basis of the quick lowering of the degree of oxygen purity. This reduction requires a deflection of the cutting stream which, as shown by experiments, apparently is so intense that the liquid slag is blown upwards from the cutting seam at a considerable distance from the torch. The slag cooled off in the seam at the end of the cutting hardly adheres to the cutting surfaces. Even the amount of slag is unexpectedly smaller than in the previously comparable cutting.

The possibility of carrying out cuts defined by their depth, whereby the cutting depth is maintained with a tolerance of at least ± 0.5 mm, opens up to flame cutting a line of new work areas. According to a further proposal of the invention, with the new process, simultaneously or in sequence at least two cuts can be carried out which meet at a certain angle.

THE DRAWINGS

DETAILED DESCRIPTION

Figure 1:
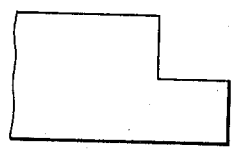
FIGS. 1, 3-7 show various cuts made by the process of this invention.
Figure 3:
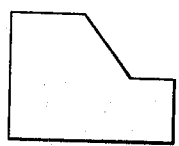
Figure 4:
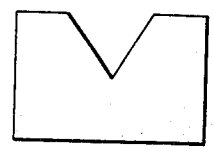

FIGS. 1, 3, and 4 show two cuts running together at right, obtuse or acute angles, of similar of different depth, and specifically over the entire length of the work piece. The separated partial piece can be easily removed. FIGS. 1 and 3 are welding edge preparations which are particularly used in plate joinings required for impact. A working out of these welding edges with a milling tool or a saw would require a multiple of the tool and work costs as compared to the flame cutting. For this reason, such edge preparations, advantageous in themselves, were omitted.

Figure 5:
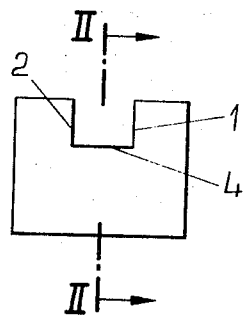
Figure 6:
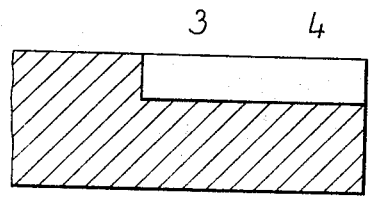
Figure 7:
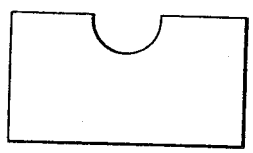

FIG. 5 (FIG. 5 shows the frontal side of a work piece and FIG. 6 a cut according to the line II—II) a square-shaped piece is cut out of a work piece in order to achieve a corresponding cutout. This cutout need not be square, but could have any desired side walls. The manner in which such curve cuts are made is generally well known in the flame cutting practice. For the separating of the square from the work piece it is necessary, however, that not only sides 1–3 of the square are cut but also the underside 4. This can take place by means of a horizontally arranged torch with respect to shallow cutting depths. With greater depths it is suitable to arrange the work piece in such a manner that the cutting can take place vertically. In this example it is suitable to lower the advance speed for the reduction of the scoring track alignment at the point where edges 1–4 come together.

Example e shows a further application of the novel process.

Below, the cutting data of the novel process are illustrated by means of several examples.

Messer Griesheim Cutting Nozzle
Fuel gas: acetylene
Material: St 37
Temperature: room temperature

| Penetration depth | Cutting nozzle | O₂-pressure, atmospheric excess pressure | Flame cone length, mm. | Nozzle distance from work piece, mm. | Cutting speed, mm./min. | Cutting seam width in the upper half, mm. | O₂-pressure at separating cut previously |
|---|---|---|---|---|---|---|---|
| 0.5 | 3-10 | 0.02 | 2-3 | 3 | 700 | 0.3 |  |
| 2.5 |  | 0.08 |  |  | 700 | 0.8 | 2.5 |
| 15 |  | 0.5 |  |  | 300 | 1.2 | 3.25 |
| 2.5 | 30-60 | 0.08 | 4-5 | 5 | 700 | 1.7 | 2.5 |
| 6.0 |  | 0.16 |  |  | 300 | 1.2 | 2.75 |
| 15.0 |  | 0.75 |  |  | 250 | 1.2 | 3.25 |
| 15.0 | 60-100 | 0.6 | 4-5 | 6 | 270 | 3.0 | 3.0 |
| 30.0 | 200-300 | 0.1 | 6-7 | 10 | 200 | 3.8 | 4.5 |
| 50.0 |  | 0.2 |  |  | 200 | 3.5 | 4.5 |
| 60.0 |  | 0.1 |  |  | 100 | 3.8 | 4.5 |

NOTE.—Cutting proceeded here always beginning with the frontal side.

According to a further proposal of the invention, a method for the plunge-cutting to a certain depth, developed for the new separating process, is suggested according to which, deviating from the initially described oblong hole punching, during the switching on of the torch advance, the cutting oxygen immediately shows the pressure which is also required for carrying out the cutting. With the inventive pressure reduction no spraying of the slag against the torch takes place. Furthermore, it is blown away opposite the advance direction by the deflected oxygen stream. After a considerably shorter time than in the known oblong hole punching, with continuous pressure increase, the desired cutting depth is achieved. A further advantage in comparison to the known oblong hole punching is that a narrow cutting seam is achieved because of the from-the-beginning focused cutting oxygen stream. With this process a work process can be carried out corresponding to the milling or blind hold boring. For this purpose, the widest possible cutting seam is of advantage.

Figure 2:
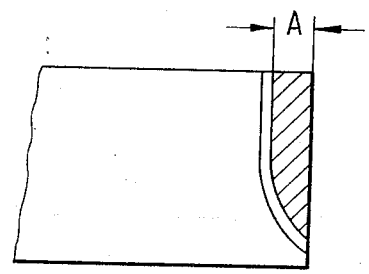
FIG. 2 shows a still further cut made in accordance with the process of this invention.

According to a further development of the invention, it is proposed to use the novel cutting process for the preparation of bell seam sides. Previously, bell seam sides were made by seam planing, as disclosed in German Pat. No. 1,171,708 and the state of the art cited there. In this process it is necessary to burn the worn out material in its entirety by exothermic reaction. In the inventive cutting process, however, a cut is carried out using the deflectability of the cutting stream and only a part of the worn out material is burned, the other part is cut off. In FIG. 2 the cut-off part is shown shaded. However, at a small distance A it can happen that the shaded part is melted off also more or less by the heat in the cutting seam.

The fact that with a flame cut a bell seam side can be produced is unexpected. The deflection of the cutting stream to the frontal surface is explained by the fact that the oxygen stream on the basis of the higher heat in the shaded part — here a heat dissipation is hardly possible in contrast to the workpiece per se in which the heat can be distributed — has a strong affinity to the shaded part, which is apparently still promoted by a reduced oxidation speed. The result is that in the lower part of the frontal surface there takes place a breakthrough of the cutting stream and there results a bell seam form. A portion of such a cut is shown in FIG. 2.

Since this invention is concerned with the cutting of grooves, etc., it differs from the conventional flame scarfing operations. In this respect a flame scarfing torch is generally disposed at a shallow angle of, for example less than about 30° and is further disposed in the plane defined by moving the torch over the workpiece to make the cut. Thus with the present invention the torch is disposed at a non-scarfing angle. Accordingly, for many operations the torch is at any suitable angle but not in the same plane as the cut, or if the torch were in the same plane as the cut the torch would be disposed at a greater angle than would be used for a scarfing operation. Since the concepts of this invention may be utilized for carrying out various types of cuts such as illustrated in the drawings, the angle of the torch may also vary. In this respect for certain cutting operations the torch would be disposed at an angle greater than 30° and as much as 90°. For other operations the torch would be disposed at an angle of 45° or greater.

Moreover for still other operations the torch would be at a angle of 60° or more.

It is also noted that, inherently, with the inventive process by utilizing the reduced oxygen proessure the kinetic energy of the oxygen emitted from the torch is insufficient to completely penetrate through the workpiece with respect to the direction of the cutting oxygen stream even if the torch were permitted to dwell over the workpiece.

What is claimed is:

1. In a process for the flame cutting of seams of predetermined depths less than the thickness of the workpiece being cut with respect to the direction of the cutting oxygen stream, characterized in setting the cutting oxygen pressure to a value which is reduced by more than 50 percent that of the standard recommended value prescribed for the particular torch used in accordance with the nozzle shape and operating parameters whereby the kinetic energy of the oxygen emitted from the torch is insufficient to completely penetrate through the workpiece with respect to the direction of the cutting oxygen stream if the torch were permitted to dwell over the workpiece, and directing the reduced cutting oxygen stream against the workpiece surface at a non-scarfing angle.

2. In a process as set forth in claim 1 wherein the cutting oxygen pressure is reduced more than 75 percent of the standard recommended value.

3. In a process as set forth in claim 1 wherein the cutting oxygen pressure is set to a value in the range of from about 0.01 to 1.0 atmospheric excess pressure.

4. In a process as set forth in claim 3 wherein the cutting oxygen pressure is set to a value in the range of from 0.1 to 0.5 atmospheric excess pressure.

5. In a process as set forth in claim 3 wherein at least two cuts are made, and the cuts forming an angle corresponding to the shape of the part to be removed.

6. In a process for autogeneous flame cutting as set forth in claim 1 characterized by guiding the torch along an edge of the workpiece at a small distance therefrom to produce a tulip-shaped seam edge whereby the cutting oxygen pressure is set to a reduced value so that the cutting oxygen stream is deflected within the workpiece against said edge and penetrates the side surface of said edge.

7. In a process as set forth in claim 1 wherein the standard recommended value is in the range of 2.5 to 4.5 atmospheric excess pressure.

8. In a process as set forth in claim 3 including preheating the workpiece surface where the cut is to take place, turning on the cutting oxygen supply when the preheated surface has reached its ignition temperature with the cutting oxygen pressure being set at its reduced value, beginning the torch advance movement simultaneously with the turning on of the cutting oxygen supply, and deflecting the cutting oxygen stream backwards from the cut against the forward movement of the torch to discharge slag upwards from the cut.

9. In a process as set forth in claim 3 including deflecting the cutting oxygen stream backwards from the cut against the forward movement of the torch to discharge slag upwards from the cut.

10. In a process for autogeneous flame cutting as set forth in claim 3 characterized by guiding the torch along an edge of the workpiece at a small distance therefrom to produce a tulip-shaped seam edge whereby the cutting oxygen pressure is set to a reduced value so that the cutting oxygen stream is deflected within the workpiece against said edge and penetrates the side surface of said edge.

11. In the process of claim 1 wherein the torch is disposed in a plane intersecting the plane of the cut.

12. In the process of claim 1 wherein the torch is disposed at an angle with respect to the workpiece surface greater than about 30°.

* * * * *